(No Model.) 2 Sheets—Sheet 2.

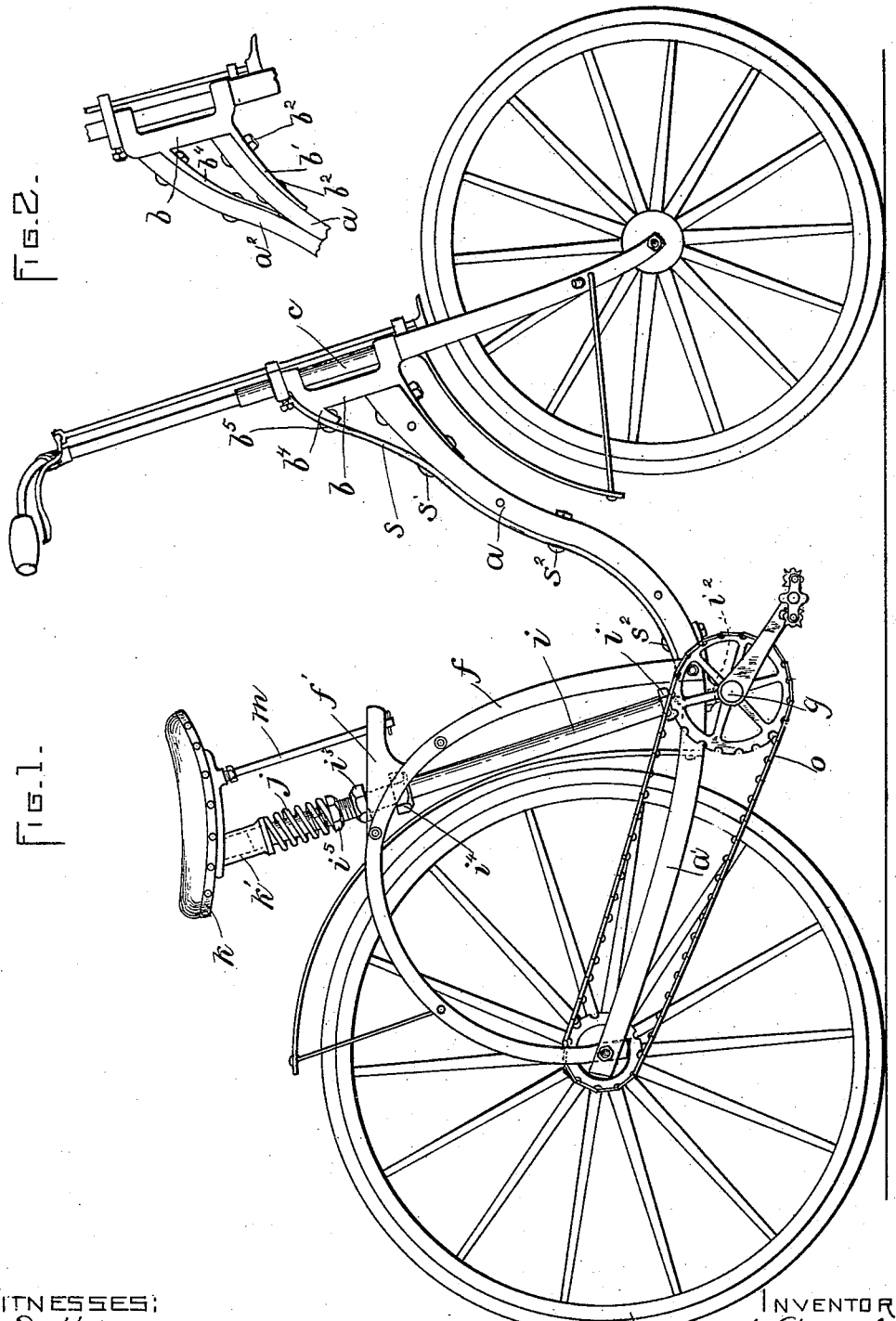

S. H. KIMBALL.
BICYCLE.

No. 487,018. Patented Nov. 29, 1892.

WITNESSES:
A. D. Harrison
B. A. McShane

INVENTOR:
S. H. Kimball
by Wright Brown Crossley
Attys.

UNITED STATES PATENT OFFICE.

STEPHEN H. KIMBALL, OF EVERETT, MASSACHUSETTS.

BICYCLE.

SPECIFICATION forming part of Letters Patent No. 487,018, dated November 29, 1892.

Application filed March 12, 1892. Serial No. 424,682. (No model.)

*To all whom it may concern:*

Be it known that I, STEPHEN H. KIMBALL, of Everett, in the county of Middlesex and State of Massachusetts, have invented certain new and useful Improvements in Bicycles, of which the following is a specification.

This invention relates to bicycles adapted to be used by ladies; and it has for its object to provide certain improvements in so-called "drop-frame" or ladies' bicycles, whereby wood may be employed as the principal material for said frame.

To this end the invention consists in the improvements which I will now proceed to describe and claim.

Figure 3:
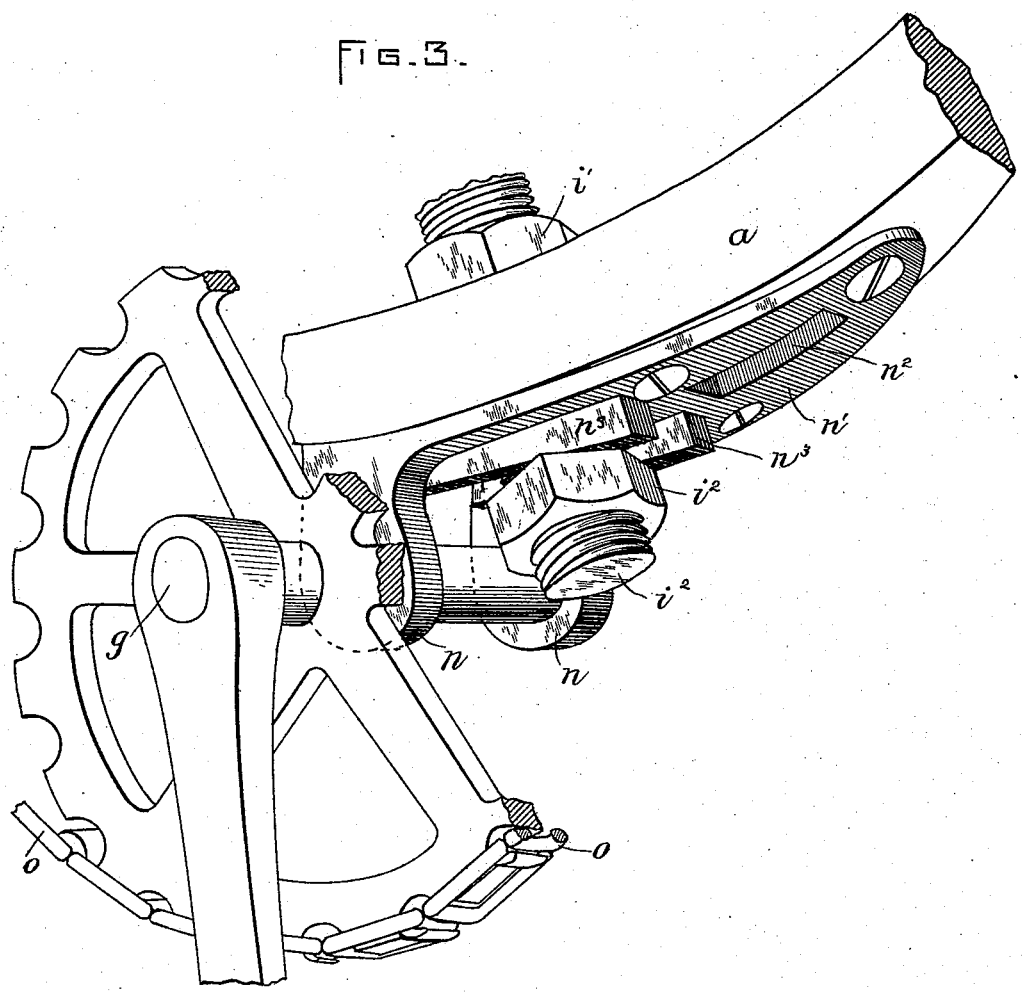
Figure 4:
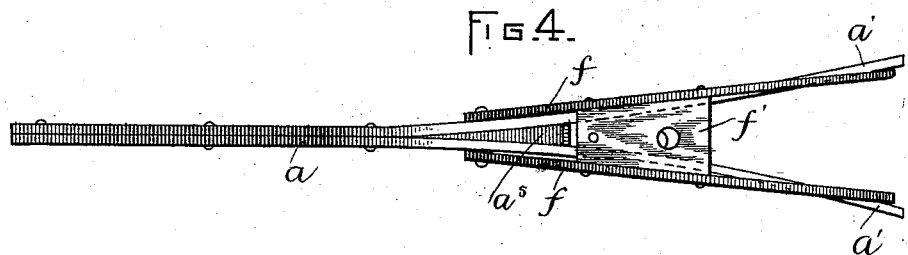

Of the accompanying drawings, forming part of this specification, Figure 1 represents a side elevation of a bicycle provided with my improvements. Fig. 2 represents a side view of a portion of the frame of the machine, showing a modification of the construction shown in Fig. 1. Fig. 3 represents a perspective view of a portion of the frame, the crank-shaft and bearings for the same attached to said frame. Fig. 4 represents a top view of the frame, all other parts being removed.

The same letters of reference indicate the same parts in all the figures.

In carrying out my invention I construct the drop-frame of a bicycle mainly of wood, said frame comprising the backbone $a$, which is provided at its front end with the head $b$, in which is journaled the fork-standard $c$, the extensions $a'$ $a'$ of said backbone, said extensions being divided so as to receive the rear wheel $e$ between them, the rear ends of the extensions receiving the axle of the rear wheel, and the arched seat-supports $f$ $f$, which are attached at their rear ends to the rear ends of the extensions $a'$ $a'$ and at their foward ends to the depressed portion of the backbone $a$. It will be seen that the backbone is curved downwardly from its forward end, and that the seat-supporting pieces $f$ spring from the lowest portion of the backbone, so that a suitable space is formed above the crank-shaft $g$ for the reception and play of the skirts of the rider. The backbone is preferably made of two pieces bolted together, the extensions $a'$ $a'$ being the ends of said pieces separated by a block $a^5$ or otherwise, as shown in Fig. 4, to receive the rear wheel. If desired, however, the backbone may be made in a single piece split lengthwise at its rear end to form the extensions $a'$ $a'$. The seat-supporting pieces $f$ $f$ are provided at their higher portions with a bracket $f'$, secured to the pieces $f$ in any suitable way, said bracket having an inclined orifice, through which passes a brace $i$, the lower end of which is affixed to the backbone $a$ by means of nuts $i'$ $i^2$ and its upper end to the bracket $f'$ by means of nuts $i^3$ $i^4$. Said brace is preferably a rod or tube of metal, screw-threaded at its ends for engagement with the nuts. The nuts $i'$ $i^2$ are arranged at opposite sides of the backbone, as shown in Fig. 3, while the nuts $i^3$ $i^4$ are arranged on opposite sides of the bracket $f'$, as shown in Fig. 1. Hence the brace $i$ is rigidly and firmly attached at its ends to the backbone and seat-supporting frame. The upper end of the brace $i$ projects above the bracket $f'$ and serves as a guide or support for a seat-spring $j$, said spring bearing at its lower end on a nut $i^5$, engaged with the brace $i$ above the nut $i^3$. The upper end of the spring $j$ bears on the lower end of a tubular boss or projection $k'$, attached to and projecting downwardly from the seat $k$. The seat is thus adapted to rise and fall, the tubular projection $k'$ being of such depth as to give it the necessary play on the upper end of the brace $i$.

$m$ represents a guide-rod affixed to the seat $k$ and projecting downwardly therefrom parallel with the brace $i$, said rod passing through a guiding-orifice in the forward portion of the bracket $f'$ and preventing the seat from turning laterally. A seat-supporting spring may be placed on this rod.

The crank-shaft $g$ is journaled in ears $n$ $n$, formed on a plate $n'$, attached to the under side of the backbone $a$. Said plate is preferably provided with a slot $n^2$ to receive attaching-bolts to secure the plate $n'$ to the backbone in case it is desirable to adjust said plate to vary the tension of the chain $o$. The plate $n'$ is preferably provided with ribs $n^3$ $n^3$, projecting downwardly from its lower side in position to bear upon the nut $i^2$, said ribs affording a better bearing for said nut than would be afforded by the under side of the plate $n'$.

The head $b$, in which the fork-standard $c$ is journaled, is bolted to the forward end of the backbone. Said head is provided at its lower portion with an ear or arm $b'$, extending for a considerable distance along the under side of the backbone and secured thereto by bolts $b^2$. To prevent the backbone from being twisted by the torsional strain exerted upon it, I provide a brace connecting the backbone with the upper portion of the head $b$. Said brace is shown in Fig. 1 as a metal rod or strap $s$, bolted to the backbone and extended upwardly therefrom to a bearing formed for it at the upper end of the head $b$, said head being preferably provided with an ear $b^4$ constituting an extension of the seat or surface on which the brace $s$ bears, said brace being attached to said ear by one or more bolts $b^5$. The brace $s$ is connected to the backbone at a point in the rear of the head by a bolt $s'$, and is preferably extended along the backbone to the lower portion thereof, as shown in Fig. 1, a suitable number of bolts, screws, or rivets $s^2$ being employed to connect the brace with the backbone.

In Fig. 2 I show the brace as composed of a wooden strip $a^2$, which is preferably of about the same size as the portion of the backbone that is connected to the lower end of the head $b$, said brace $a^2$ being bolted to the ear $b^4$ on the head, which ear is shown as considerably longer than that shown in Fig. 1. It will be observed that the brace connecting the forward portion of the backbone with the upper portion of the head, the backbone being connected with the lower portion of the head, makes the construction extremely strong and durable at this point, and prevents any liability of wrenching the backbone from its connection with the head by torsional strain.

I claim—

1. In a bicycle, the drop-frame composed of the backbone curved downwardly from its forward end and provided with the separated extensions at opposite sides of the rear wheel and the arched seat-supporting pieces attached at their rear ends to the rear portions of said extensions and at their front ends to the lower portion of the backbone, as set forth.

2. In a drop-frame for bicycles, the combination of the backbone curved downwardly from its upper end and provided with the separated rear extensions, the arched seat-supporting pieces, and the brace attached to the upper portions of the arched pieces and to the lower portion of the backbone, as set forth.

3. In a drop-frame for bicycles, the combination of the backbone curved downwardly from its upper end and provided with the separated rear extensions, the arched seat-supporting pieces having a connecting block or bracket at their upper portions, the brace attached at its lower end to the backbone and at its upper portion to said bracket, the said brace extending above the bracket and being provided with a nut $i^5$, the seat having a tubular projection receiving the upper end of the brace, and the spring interposed between said projection and nut.

4. In a drop-frame bicycle, the backbone composed of one or more strips of wood and having a strip of metal attached to its upper side, the upper portion of said strip being extended or bent upwardly from the wood and constituting a brace, combined with the head attached at its lower portion to the upper end of the backbone and at its upper portion to said brace, as set forth.

5. In a drop-frame bicycle, the combination of the head having the rearwardly-projecting ears at its lower and upper portions, the backbone attached to the lower ear, and the brace attached to the backbone and to the upper ear, as set forth.

In testimony whereof I have signed my name to this specification, in the presence of two subscribing witnesses, this 8th day of March, A. D. 1892.

STEPHEN H. KIMBALL.

Witnesses:
C. F. BROWN,
A. D. HARRISON.